BENJAMIN T. BABBITT.
Improvement in Process for Boiling Soap under Pressure.
No. 127,827.  Patented June 11, 1872.
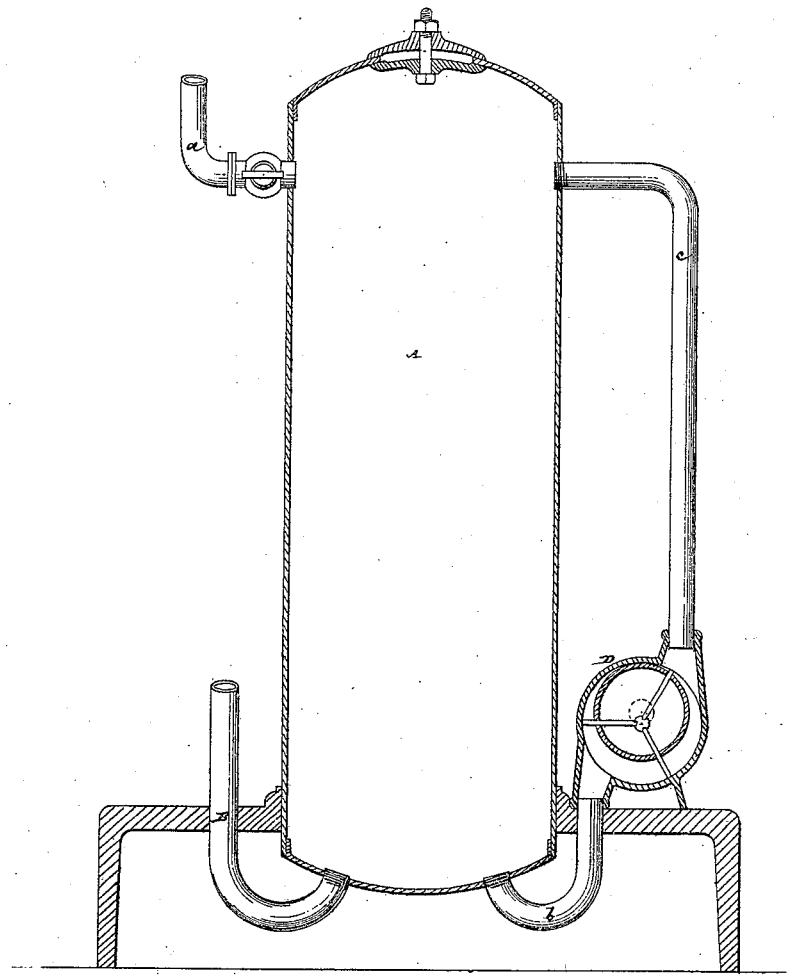

127,827

UNITED STATES PATENT OFFICE.

BENJAMIN T. BABBITT, OF NEW YORK, N. Y.

IMPROVEMENT IN PROCESSES FOR BOILING SOAP UNDER PRESSURE.

Specification forming part of Letters Patent No. 127,827, dated June 11, 1872.

*To all whom it may concern:*

Be it known that I, BENJAMIN T. BABBITT, of the city, county, and State of New York, have invented a new and useful Improvement in the Process of Boiling Soap under Pressure; and I do hereby declare that the following is a full, clear, and exact description of the same, reference being had to the accompanying drawing forming part of this specification, and which represents a sectional elevation of an apparatus applicable to carrying out my improvement.

In making soap from certain oils or fatty matters in a closed vessel under heat and pressure it is very advantageous and, when using certain lye, necessary to keep up an agitation of the ingredients in the vessel for the purpose of producing a proper mixing of the ingredients to effect saponification of the fatty matter with the alkali. Stirrers or machinery arranged within the closed vessel for accomplishing the same fail to effect the thorough agitation that is necessary, and are an obstruction within the vessel, which is objectionable. My invention consists in a process of making soap under pressure, in which two elements, to effect a perfect success, are employed—namely, first, the heating of the mass in the closed vessel by steam of a high temperature, but low pressure—that is to say, by superheated steam, preferably of about one hundred pounds' pressure and 360° temperature, or thereabout; and, secondly, by maintaining a perfect agitation of the whole body of the heated mass by means of a pump on the outside of the vessel, and connecting with the latter above and below, for the purpose of keeping up a circulation and thorough agitation within the vessel.

Referring to the accompanying drawing, A represents a closed vessel, into which the ingredients are introduced, as by a pipe, a, which pipe, by a suitable branch, may also serve for the subsequent introduction of the superheated steam among the mass. Connected with said vessel, at or near its bottom, is a pipe, B, for discharging, when required, the contents under pressure. D is a pump, of a rotary or other suitable description, arranged on the outside of the vessel A so as to be readily accessible, and leaving the interior of said vessel clear of all objectionable obstruction or machinery. This pump is made to connect with the upper and lower portions of the vessel A by means of a suction-pipe, b, and delivery-pipe c, and serves, by the circulation which it thus effects, to keep up a thorough agitation of the whole body of the heated mass, injecting the lye onto the top of the oil or fatty matter, and producing a most perfect commingling of the ingredients under exposure of the mass as thus agitated to the superheated steam entering by the pipe a, and preferably of or about the pressure and temperature hereinbefore indicated.

What is here claimed, and desired to be secured by Letters Patent, is—

1. The process herein described of making soap under pressure by means of a pump arranged to connect above and below with the closed vessel in which the mass is being treated, and whereby a circulation within said vessel and thorough agitation of its ingredients are effected, substantially as specified.

2. The use of superheated steam in the manufacture of soap under pressure, for heating the mass, essentially as described.

B. T. BABBITT.

Witnesses:
 FRED. HAYNES,
 FERD. TUSCH.